(12) United States Patent
Hatchette

(10) Patent No.: US 9,858,834 B2
(45) Date of Patent: Jan. 2, 2018

(54) APPARATUS FOR TEACHING GAS PROPERTIES

(71) Applicant: Paul Hatchette, Saint-John (CA)

(72) Inventor: Paul Hatchette, Saint-John (CA)

(73) Assignee: Kimberly A. Hatchette, Saint John, N.B. (CA)

(*) Notice: Subject to any disclaimer, the term of this patent is extended or adjusted under 35 U.S.C. 154(b) by 596 days.

(21) Appl. No.: 14/544,017

(22) Filed: Nov. 14, 2014

(65) Prior Publication Data

US 2016/0140874 A1    May 19, 2016

(51) Int. Cl.
  *G09B 23/12* (2006.01)
  *G09B 23/06* (2006.01)
  *G09B 23/08* (2006.01)

(52) U.S. Cl.
  CPC ............ *G09B 23/12* (2013.01); *G09B 23/06* (2013.01); *G09B 23/08* (2013.01)

(58) Field of Classification Search
  CPC ........ G09B 23/12; G09B 23/06; G09B 23/08; B01D 45/00
  USPC ........................................................ 434/302
  See application file for complete search history.

(56) References Cited

U.S. PATENT DOCUMENTS 3,934,964 A * 1/1976 Diamond ................ F03B 17/04
                                                        415/5
4,718,232 A * 1/1988 Willmouth ............. F03B 17/04
                                                        290/1 R
5,944,480 A    8/1999 Forrest

FOREIGN PATENT DOCUMENTS

CN             203013072 U  *  6/2013

* cited by examiner

*Primary Examiner* — Jack Yip
*Assistant Examiner* — Jennifer L Korb
(74) *Attorney, Agent, or Firm* — Mario Theriault

(57) ABSTRACT

The apparatus has a transparent casing and an oblong toroidal shape in the form of a bucket elevator. First and second vertical compartments are separated by a partition and a clear cylindrical passage is formed around the circumference of the apparatus. First and a second sheaves are mounted above one another along the partition. A flexible loop is mounted around the sheaves and a series of balloons attached to the flexible loop at spaced intervals. The first compartment is opened to ambient air. The lower region is filled with argon gas and the second compartment is filled with helium gas. The balloons are filled with the helium gas such that the balloons have buoyancy in the first compartment and heaviness in the second compartment, and the pool of argon gas impedes the diffusion of ambient air in the second compartment.

20 Claims, 2 Drawing Sheets

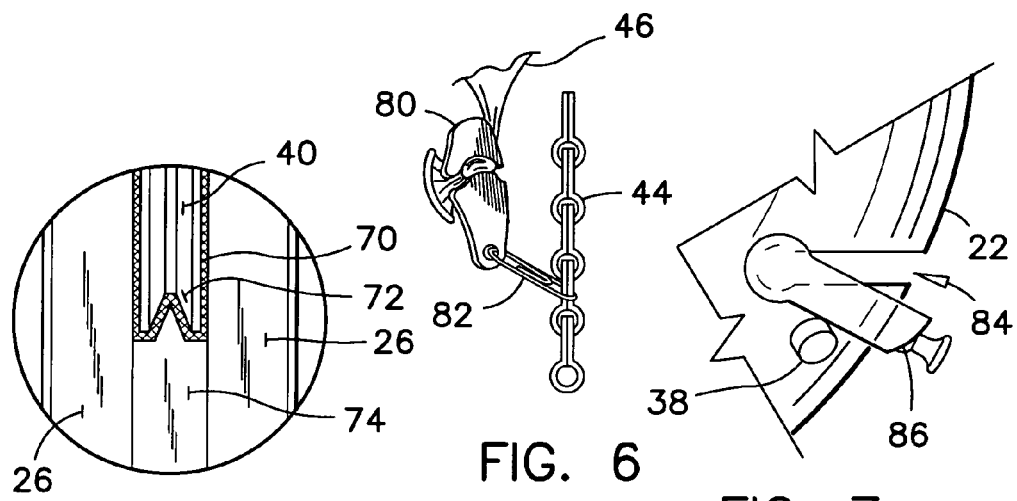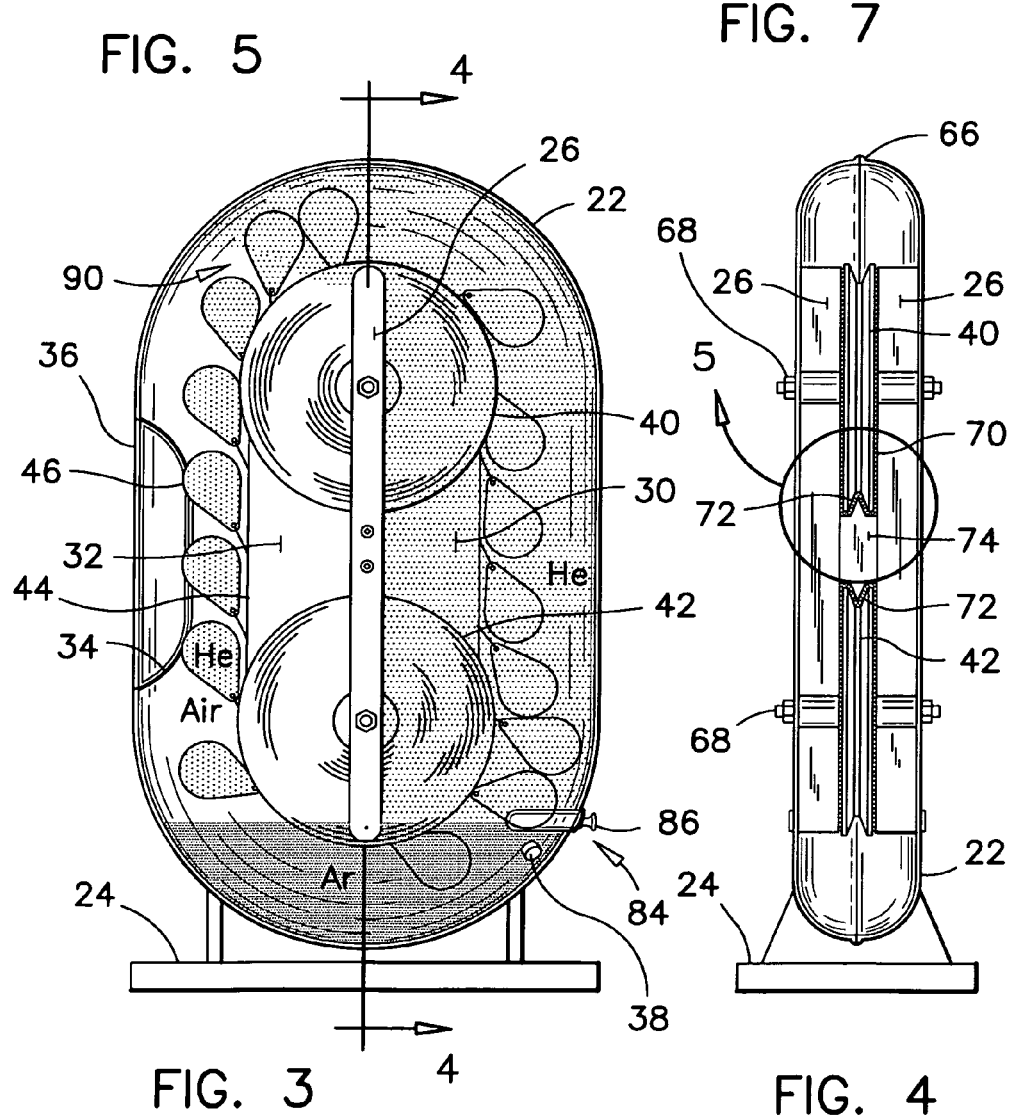

APPARATUS FOR TEACHING GAS PROPERTIES

FIELD OF THE PRESENT INVENTION

The present invention pertains to the field of educational devices, and more particularly it pertains to an apparatus to visually demonstrate gas properties.

BACKGROUND OF THE PRESENT INVENTION

The best teaching methods include physical demonstrations of the subject-matter being taught. When the new knowledge can be seen, heard or touched, it is easier to assimilate and to be retained by students. If the demonstration apparatus also stimulates the imagination, the new knowledge being taught is more effectively absorbed and remembered.

The properties of gases and fluid mechanics in particular are difficult subjects to teach because gases are invisible and impalpable. Other that hot air balloons, which are impractical devices for use in a classroom environment, teaching methods on gas properties are limited to chalk and blackboard explanations.

It is believed that there is a need in the education system for an apparatus that can be used to demonstrate gas densities, buoyancy and the diffusion rates of different gases. It is believed that there is a need for a classroom or lecture hall size educational device that can be used to visualize the presence of a gas therein, and to feel the buoyancy force exerted by that gas on a floating balloon.

SUMMARY OF THE PRESENT INVENTION

In the present invention, there is provided an apparatus having a transparent casing and an oblong toroidal shape in the form of a bucket elevator. The apparatus is particularly appropriate for visually demonstrating the buoyancy of balloons filled with helium gas in ambient air and in argon gas. The apparatus has appropriate dimensions for operation in a classroom or lecture hall so that students can learn gas properties by visual experience.

In a first embodiment of the present invention, there is provided an apparatus for teaching gas properties, comprising: an oblong hollow casing having first and second vertical compartments separated by a partition and a clear cylindrical passage around the circumference thereof. A first and second sheaves are mounted above one another along the partition. A gas seal is mounted between the sheaves and the partition. A flexible loop, is mounted around the sheaves and a series of balloons is attached to the flexible loop at spaced intervals.

The casing has an upper region and a lower region communicating with the first and second vertical compartments. The first vertical compartment is openable to ambient air. The second vertical compartment is filled with a light gas lighter than ambient air. The lower region or the casing is filled with a heavy gas heavier than ambient air.

The balloons are filled with the light gas, such that the balloons have buoyancy in the first vertical compartment and heaviness in the second vertical compartment. The heavy gas impedes the diffusion of ambient air in the second vertical compartment.

In another aspect of the present invention, the heavy gas is argon and the light gas is helium.

In yet another aspect of the present invention, there is provided an installation for repeatedly teaching gas properties. This installation comprises the aforesaid apparatus and a pressurized helium gas bottle for replenishing the light-gas compartment when ambient air has diffused into the light gas and increased the buoyancy of the balloons in the light-gas compartment.

Because the apparatus has the shape of a bucket elevator, the rotation of the balloons and the flexible loop around the sheaves excites the imagination of students. A first reaction by students is that they believe having discovered a new self-sustained power generator. They try to imagine ways to make it work continually without slowing down. The apparatus provides a visible demonstration of gas densities, gas buoyancy, gas diffusion, and it excites the imagination of students, helping them to understand and to remember what has been demonstrated by the operation of the apparatus.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 3 is a first elevation cross-section view of the preferred apparatus as seen along line 3-3 in FIG. 2;

FIG. 4 is a second elevation cross-section view of the preferred apparatus as seen along line 4-4 in FIG. 3;

FIG. 5 is an enlarged view of the detail circle 5 in FIG. 4;

FIG. 6 is an enlarged view of a preferred balloon attachment;

FIG. 7 is an enlarged view of a portion of the casing showing a slot and slot cover in an open mode in the lower end of the light-gas compartment.

DETAILED DESCRIPTION OF THE PREFERRED EMBODIMENT

Figure 2:
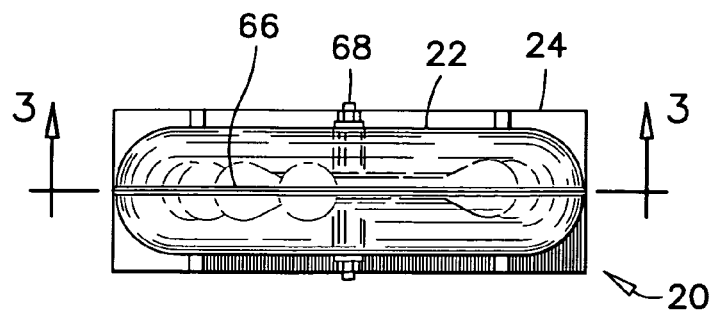
FIG. 2 is a top view of the preferred apparatus for teaching gas properties.
Figure 1:
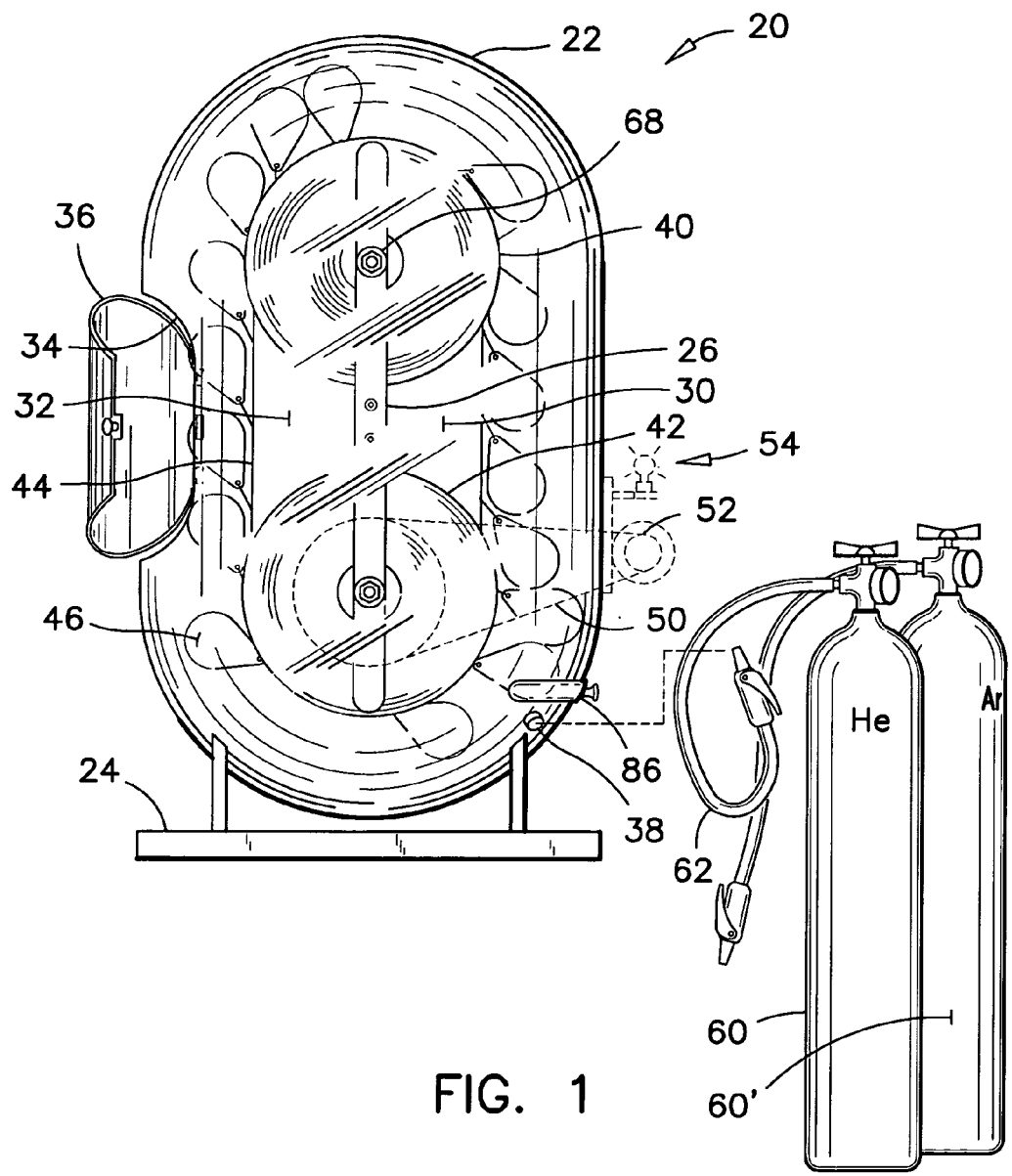
FIG. 1 is a front elevation view of a transparent apparatus for teaching gas properties, according to the preferred embodiment of the present invention.

Referring firstly to FIGS. 1 and 2, the apparatus 20 for teaching gas properties is illustrated therein. Generally, the apparatus 20 has a casing 22 that is made of a transparent material such that the elements mounted therein and their movements can be observed. The casing 22 is mounted on a stand 24. The casing 22 is self-supporting on the stand 24. The apparatus 20 has a relative weight and dimensions such that it can be easily set and operated in a classroom or lecture hall environment.

The casing 22 has a hollow oblong shape, and is divided in two vertical compartments by a vertical partition 26. The shape of the casing is defined as a stretched toroidal form defining a clear cylindrical passage around the full circumference of the casing 22. The apparatus 20 also has the shape of a bucket elevator. The longer dimension of the casing 22 is set vertically on the stand 24.

Referring to FIG. 1, the vertical region on the right-hand side of the partition 26 is referred to as the light-gas compartment 30, and the vertical region on the left-hand side of the partition 26 is referred to as the ambient air compartment 32. The ambient air compartment 32 has an opening 34 in the casing 22, communicating with ambient air outside the apparatus 20. The casing 22 also has a hinged cover 36 for selectively closing over the opening 34. The cover 36 preferably has a seal there-around such as to selectively closing the opening 34 hermetically during the setting-up of the apparatus 20. The reasons for closing the opening 34 during set-up will be provided in the following description.

The right-side vertical light-gas compartment 30 has a openable fill plug 38 therein in a lower region thereof for introducing gases to be studied into the casing 22.

A pair of sheaves 40, 42 are integrated into the partition 26, one above the other. The sheaves 40, 42 have a same diameter and their centers are set apart a vertical distance that is greater than that diameter. A flexible loop 44 is threaded around both sheaves 40, 42, and a series of balloons 46 is attached to the flexible loop 44 at equally spaced intervals along the length of the flexible loop 44.

The opening 34 and the cover 36 in the ambient air compartment 32 of the casing 22 are as wide as the casing itself, and at least twice as high as its width. The opening 34 is wider than the balloons 46 such that the balloons 46 can be manually attached to, or detached from the flexible loop 44 through this opening 34.

An optional power transmission mechanism 50; a small generator 52; a light bulb 54 and a switch (not shown) can be mounted to the outside of the casing 22 to effectually demonstrate the energy available from the buoyancy of the balloons 46 in different gases during a demonstration session. These items are optionally used to further excite the imagination of students being taught gas properties. These items are illustrated in dashed lines to underline the optional nature of these accessories, and to show their nonessential aspect in the operation of the apparatus 20.

In FIG. 1, there is also illustrated a pair of pressurized gas bottles 60, 60'. Preferably, these bottles include a bottle of helium He gas and a bottle of argon Ar gas. A hose and nozzle assembly 62 on each bottle are used to connect each gas bottle 60, 60' to the fill plug 38 to replenish the amount of gas required inside the light-gas compartment 30 and in the lower region of the casing 22, for operating the apparatus.

Referring to FIG. 2, the casing 22 is preferably made of two halves joining at a seam 66 extending along a median vertical plane of the apparatus 20. Both halves are held together by bolts 68 extending along the support bearings of both sheaves 40, 42, for example.

Additional structural details of the preferred apparatus 20 are illustrated in FIGS. 3, 4, 5, 6 and 7. Both sheaves 40, 42 have smooth surfaces and are sealed along the partition 26 by a low friction gasket 70. The gas seal or gasket 70 extends along both sides of the sheaves 40, 42 as well as in the juxtaposed V-shaped grooves 72 of the sheaves 40, 42, to reduce the diffusion of the gases across the partition 26. The vertical space between the sheaves 40, 42 is blocked by a spacer 74 which supports the gasket 70 sealing the juxtaposed V-shaped grooves 72. The spacer 74 is an integral part of the partition 26.

Referring to FIG. 6, each balloon 46 is attached to the flexible loop 44, by a balloon closure 80 and a detachable clip 82 or by any other similar simple and easy attachment. Preferably, the attachment of the balloons 46 to the flexible loop 44, is done without difficulty through the ambient air opening 34 in the casing 22.

The expression "flexible loop" 44 is used herein for convenience only. The expression flexible loop 44 means a flexible band, a line, a thread, a chain, a rope, a wire, a string, or a belt.

Referring particularly to FIGS. 1 and 3, the operation of the preferred apparatus 20 will be explained in greater details.

Using a bottle 60 of helium gas He under pressure, all the balloons 46 are filled with helium gas.

Using the fill plug 38 and a bottle 60' of argon gas Ar, the lower region of the casing 22 is filled with argon gas Ar up to a desired upper level enclosing the lower end of the partition 26.

In order to prevent over filling the lower region of the casing 22 with argon gas Ar, a slot 84 and removable slot cover 86 are provided in the casing 22 at the desired upper level of argon gas in the lower region of the casing 22. This slot 84 is kept open during the filling of the lower portion of the casing with argon gas Ar. The slot 84 and the slot cover 86 are better illustrated in FIG. 7.

Using the fill plug 38 again, the vertical light-gas compartment 30 is filled with helium gas He. During the filling up of the light-gas compartment 30 with helium gas He, the slot 84 is also kept open. The ambient air in the light-gas compartment 30 is forced downward by the rising helium gas He, pushing the ambient air out of the light-gas compartment 30 through the slot 84.

During the filling up of the light-gas compartment 30 with helium gas He, the hinged cover 36 is preferably kept closed on the ambient air opening 34 so that the helium gas He somewhat compresses the ambient air inside the ambient air compartment 32, which in turn prevents the helium gas He from escaping out of the casing 22 through the ambient air opening 34.

The slot cover 86 is closed over the slot 84 as soon as the helium gas He has been introduced in the light-gas compartment 30. Ideally, the helium gas He fills the light-gas compartment 30 up to about a transition region 90 as shown in FIG. 3.

It will be appreciated that because helium gas He is colourless and odourless, the filling-up of the light-gas compartment 30 can only be confirmed by the behaviour of the balloons 46 inside the apparatus 20, and by the temperature of the casing 22 of the apparatus. Because of the well known relation of pressure-temperature-volume of gases, the helium gas entering the light-gas compartment 30 is much colder than ambient air, and therefore a colder temperature at the upper portion of the casing, at the transition region 90 for example, is an indication of the presence of helium He at that location. Similarly, the temperature of the ambient air exiting the light-gas compartment 30 through the slot 84, during the filling-up of that compartment 30 with helium gas He can be monitored in a same way, by feeling the temperature of the ambient air exiting the slot 84. Therefore, the temperature of the casing 22, the temperature of the ambient air flowing out of the slot 84 and the behaviour of the balloons 46 inside the apparatus 20 are three factors providing experience to a user of the apparatus such that the skills required for setting up the apparatus 20 can be acquired relatively quickly. Once a time for filling of each of the gases has been established, a timer (not shown) can be used for the set-up process.

Given that the molecular weights of the three gases present are as illustrated in Table 1 herein below, the balloons 46 rise in the vertical ambient air compartment 32, sink on their own weight in the vertical light-gas compartment 30 and cause the flexible loop 44 and sheaves 40, 42 to rotate.

TABLE 1

| Gas | Molecular weight |
|---|---|
| Air | 26 |
| Argon | 39.95 |
| Helium | 4.02 |

The three gases used in the description of the apparatus 20 of the preferred embodiment are mentioned herein as examples only as other gases can also be used according to the same principles.

Because the vertical light-gas compartment 30 is sealed at the lower end by the heavy argon gas Ar, and sealed by the gasket 70 along the partition 26, the helium gas He does not escape quickly from the light-gas compartment 30. For a period of time after the light-gas compartment 30 has been filled with helium gas He, the balloons 46 rise in the ambient air compartment 32 and sink by gravity in the light-gas compartment 30.

A slight resistance is required to pass the balloons 46 through the heavy argon gas Ar at the bottom of the casing 22, from one vertical compartment 30 to the other 32. However this resistance is less that the torque generated by the balloons 46 rising in the ambient air compartment 32, and therefore, the balloons 46 and the flexible loop 44 continue to rotate around both sheaves 40, 42 for a fair period of time after setup. During this condition, the effect of gas density on the balloons 46 can be easily observed and taught to students looking at the apparatus. During this condition, the generator 52 and light bulb 52 may be used to demonstrate buoyancy forces associated with the movement of the balloons 46 and the flexible loop 44.

It will be appreciated that the illustrations of the preferred apparatus 20 has been drawn for dimensional convenience only. This apparatus 20 can be taller and have many more balloons or other buoyant objects than the embodiment illustrated in the drawings.

As the balloons 46 rotate around the upper sheave 40, ambient air is carried by surface tension on the balloons 46 into the light-gas compartment 30. The helium gas He also seeps slowly through the gasket 70 and into the ambient air compartment 32. Consequently, the rotation of the balloons 46 around the sheaves 40, 42 eventually stops.

Using the helium gas bottle 60 standing nearby and the fill plug 38, the light-gas compartment 30 is replenished with helium gas He. As the helium gas He is introduced in the light-gas compartment 30 with the slot 84 open, and replaces the ambient air present there, the balloons 46 and the flexible loop 44 start to rotate again around the sheaves 40, 42. The difference in molecular weights between ambient air and helium gas is thereby convincingly illustrated to students. The balloons 46 "falteringly" entering the argon gas Ar pool at the lower end of the light-gas compartment 30 and "popping" out into the lower end of the ambient air compartment 32 is also a convincing demonstration of the differences in molecular weights between helium gas and argon gas and between argon gas and ambient air.

The apparatus for teaching gas properties can also be used to visually demonstrate the rate of diffusion of one gas into another. This demonstration is carried out by filling the light-gas compartment 30 with helium gas He until the concentration of helium gas He in the light-gas compartment 30 is relatively high, and then letting the apparatus 20 run until it stops on its own. At that point it will be understood by students monitoring the operation of the apparatus 20 that ambient air has infiltrated into the light-gas compartment 30 and that buoyancy on the balloons 46 has become equal on both sides of the partition 26.

The apparatus 20 can be operated repeatedly until the balloons 46 lose their helium gas He by permeation. The balloons 46 are easily unhooked from the flexible loop 44, refilled and reattached to the flexible loop 44 for a subsequent demonstration to another class of students for example. The apparatus 20 to teach gas properties according to the preferred embodiment of the present invention can be used over and over again and is thereby appropriate for use as a teaching device in a classroom or lecture hall environment.

What is claimed is:

1. An apparatus for teaching gas properties, comprising:
an oblong hollow casing having first and second vertical compartments separated by a partition, said oblong hollow casing defining a clear cylindrical passage around a circumference of said oblong hollow casing;
first and second sheaves mounted one above the other along said partition;
a flexible loop mounted around said sheaves and a series of balloons attached to said flexible loop at spaced intervals;
said casing also having an upper region and a lower region therein communicating with said first and second compartments;
said first compartment being opened to ambient air;
said second compartment being filled by a light gas, said light gas being lighter than said ambient air;
said lower region being filled with a heavy gas and said heavy gas being heavier than said ambient air such that said heavy gas impedes a diffusion of said ambient air in said second compartment;
said balloons being filled with said light gas such that said balloons have buoyancy in said first compartment and heaviness in said second compartment.

2. The apparatus as claimed in claim 1, wherein said casing has a stretched toroidal shape.

3. The apparatus as claimed in claim 1, wherein said casing is made of a transparent material.

4. The apparatus as claimed in claim 1, wherein said heavy gas is argon and said light gas is helium.

5. The apparatus as claimed claim 1, further comprising a fill plug in said lower region below said second compartment.

6. The apparatus as claimed in claim 1, further comprising a stand and dimensions appropriate for setting up in a classroom or lecture hall environment.

7. The apparatus as claimed in claim 1, further comprising a gas seal along said sheaves, wherein said gas seal is a low friction gasket.

8. The apparatus as claimed in claim 7, wherein said sheaves have smooth surfaces.

9. The apparatus as claimed in claim 1, wherein each of said balloons is attached to said flexible loop by a detachable clip.

10. The apparatus as claimed in claim 1, having a shape of a bucket elevator.

11. The apparatus as claimed in claim 1, wherein said sheaves have a same diameter.

12. An installation for teaching gas properties, comprising:
an apparatus for teaching gas properties, comprising:
an oblong hollow casing having first and second vertical compartments separated by a partition and a stretched toroidal form defining a clear cylindrical passage around a circumference of said oblong hollow casing;

first and second sheaves mounted one above the other along said partition;

said first and second sheaves having a same diameter;

a gas seal mounted between said sheaves and said partition;

a flexible loop mounted around said sheaves and a series of balloons attached to said flexible loop at spaced intervals;

said casing also having an upper region and a lower region therein communicating with said first and second compartments;

said first compartment being opened to ambient air;

said second compartment being filled by a light gas, said light gas being lighter than said ambient air;

said lower region being filled with a heavy gas and said heavy gas being heavier than said ambient air such that said heavy gas impedes a diffusion of said ambient air in said second compartment;

said balloons being filled with said light gas such that said balloons have buoyancy in said first compartment and heaviness in said second compartment;

said casing comprising a fill plug in said lower region below said second compartment; and a pressurized light gas bottle with a hose and nozzle assembly for periodically replenishing said second compartment with said light gas through said fill plug when said ambient air and said light gas have diffused into each other.

13. The installation as claimed in claim 12, wherein said heavy gas is argon and said light gas is helium.

14. The installation as claimed in claim 12, wherein said casing is made of a transparent material.

15. The installation as claimed in claim 12, wherein said gas seal is a low friction gasket, and said sheaves have smooth surfaces.

16. The installation as claimed in claim 12, wherein each of said balloons is attached to said flexible loop by a detachable clip; said casing has an opening in said first compartment and said opening is larger that a size of said balloons.

17. The installation as claimed in claim 12, wherein said apparatus has the shape of a bucket elevator.

18. The installation as claimed in claim 17, wherein said apparatus has a stand and a dimensions appropriate for mounting in a classroom or lecture hall.

19. An installation for teaching gas properties, comprising:

an apparatus for teaching gas properties, comprising:

an oblong hollow transparent casing having first and second vertical compartments separated by a partition and a stretched toroidal form defining a clear cylindrical passage around a circumference of said oblong hollow casing;

said casing having a shape of a bucket elevator;

first and second sheaves mounted one above the other along said partition;

said first and second sheaves having a same diameter;

a gas seal mounted between said sheaves and said partition;

a flexible loop mounted around said sheaves and a series of balloons attached to said flexible loop at spaced intervals;

said casing also having an upper region and a lower region therein communicating with said first and second compartments;

said first compartment being opened to ambient air;

said casing having an opening in said first compartment, wherein said opening is larger than a size of said balloons;

said second compartment being filled by a helium gas;

said lower region being filled with argon gas;

said balloons being filled with helium gas such that said balloons have buoyancy in said first compartment and heaviness in said second compartment;

said casing comprising a fill plug in said lower region below said second compartment; and a pressurized light gas bottle with a hose and nozzle assembly for periodically replenishing said second compartment with said light gas through said fill plug when said ambient air and said light gas have diffused into each other.

20. The installation as claimed in claim 19, wherein each of said balloons is attached to said flexible loop by a detachable clip.

* * * * *